(12) United States Patent
Yonezawa

(10) Patent No.: US 8,983,671 B2
(45) Date of Patent: Mar. 17, 2015

(54) DATA COLLECTING APPARATUS AND DATA COLLECTING METHOD

(75) Inventor: Minoru Yonezawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/535,816

(22) Filed: Jun. 28, 2012

(65) Prior Publication Data

US 2013/0079940 A1 Mar. 28, 2013

(30) Foreign Application Priority Data

Sep. 27, 2011 (JP) ................................. 2011-210891

(51) Int. Cl.
*H02J 3/00* (2006.01)
*G06Q 50/06* (2012.01)
*G06Q 90/00* (2006.01)

(52) U.S. Cl.
CPC ................ *G06Q 50/06* (2013.01); *G06Q 90/00* (2013.01); *H02J 2003/003* (2013.01); *Y04S 10/54* (2013.01)
USPC .......................................... 700/291; 700/286

(58) Field of Classification Search
None
See application file for complete search history.

(56) References Cited

U.S. PATENT DOCUMENTS

| | | | | |
|---|---|---|---|---|
| 5,918,222 | A * | 6/1999 | Fukui et al. ............................ | 1/1 |
| 6,865,450 | B2 * | 3/2005 | Masticola et al. ............ | 700/291 |
| 8,386,086 | B2 * | 2/2013 | Roux et al. .................... | 700/291 |
| 8,406,935 | B2 * | 3/2013 | Ko et al. ........................ | 700/291 |
| 8,417,391 | B1 * | 4/2013 | Rombouts et al. ............ | 700/291 |
| 2003/0055677 | A1 * | 3/2003 | Brown et al. ...................... | 705/1 |
| 2003/0083787 | A1 * | 5/2003 | Harada et al. ................. | 700/291 |
| 2004/0249775 | A1 * | 12/2004 | Chen ................................. | 706/21 |
| 2010/0023174 | A1 * | 1/2010 | Nagata et al. ................. | 700/287 |
| 2010/0179704 | A1 * | 7/2010 | Ozog ............................ | 700/291 |
| 2010/0306001 | A1 * | 12/2010 | Discenzo et al. ................. | 705/7 |
| 2011/0071693 | A1 * | 3/2011 | Sun et al. ...................... | 700/291 |
| 2011/0173109 | A1 * | 7/2011 | Synesiou et al. ................ | 705/34 |
| 2011/0202191 | A1 * | 8/2011 | Larsson et al. ................ | 700/287 |
| 2012/0065792 | A1 | 3/2012 | Yonezawa et al. | |
| 2012/0290104 | A1 * | 11/2012 | Holt et al. ....................... | 700/29 |
| 2013/0054040 | A1 * | 2/2013 | Takahashi et al. ............ | 700/291 |
| 2013/0311236 | A1 * | 11/2013 | Takahashi et al. ........... | 705/7.31 |

FOREIGN PATENT DOCUMENTS

| | | |
|---|---|---|
| JP | 2010-124644 | 6/2010 |
| JP | 2010-178468 | 8/2010 |

* cited by examiner

*Primary Examiner* — Ryan Jarrett

(74) *Attorney, Agent, or Firm* — Oblon, McClelland, Maier & Neustadt, L.L.P.

(57) ABSTRACT

There is provided a data collecting apparatus in which a collector collects, from demanders, demand record data and demand forecast data of the energy; a data history manager; a reliability level calculator calculates, for each demander, a reliability level of the demand forecast data; a supply plan data receiver receives an acquisition request of demand forecast data of a future predetermined time range with respect to each demander from an energy management system; and a data acquisition plan maker makes a collection plan such that the demand forecast data of the future predetermined time range and the demand record data are collected earlier from a demander with a higher reliability level, wherein the data collector collects according to the collection plan, and the data history manager provides the collected demand forecast data to the energy management system before a start time of the future predetermined time range.

10 Claims, 17 Drawing Sheets

DEMANDER RELIABILITY LEVEL TABLE

| DEMANDER | RELIABILITY LEVEL | COLLECTION CYCLE |
|---|---|---|
| DEMANDER 1 | 45.2 | 8 |
| DEMANDER 2 | 5.2 | 4 |
| DEMANDER 3 | 0.1 | 1 |
| DEMANDER 4 | 10.1 | 4 |
| DEMANDER 5 | 1.5 | 2 |
| DEMANDER 6 | 15.2 | 4 |
| DEMANDER 7 | 0.2 | 1 |

FIG. 3

DEMANDER RELIABILITY LEVEL TABLE

| DEMANDER | RELIABILITY LEVEL | COLLECTION CYCLE |
|---|---|---|
| DEMANDER 1 | 45.2 | 16 |
| DEMANDER 2 | 5.2 | 8 |
| DEMANDER 3 | 0.1 | 2 |
| DEMANDER 4 | 10.1 | 8 |
| DEMANDER 5 | 1.5 | 4 |
| DEMANDER 6 | 15.2 | 8 |
| DEMANDER 7 | 0.2 | 2 |

FIG. 8

DATA COLLECTING APPARATUS AND DATA COLLECTING METHOD

CROSS REFERENCE TO RELATED APPLICATIONS

This application is based upon and claims the benefit of priority from the prior Japanese Patent Application No. 2011-210891, filed on Sep. 27, 2011, the entire contents of which are incorporated herein by reference.

FIELD

Embodiments describe herein relate to a data collecting apparatus and a data collecting method for collecting demand forecast data from a demander.

BACKGROUND

There has been proposed a technique of correcting a discrepancy between a forecast and an actuality experientially through machine learning. This technique has a problem that an operation plan cannot be correctly made in the case where a significant discrepancy between a forecast result and actual data occurs in an unexpected fashion. In addition, this technique is based on the premise that data used for forecasting can be collected with a relatively high frequency. Hence, this technique has a problem that only a plan with a low reliability level can be made in the case where the collection interval of the data is long and thereby the reliability of the forecast thus decreases.

There has also been proposed, as another conventional technique, a technique in which: a plurality of demander nodes are kept informed of an amount of supply-demand unbalance that is sequentially observed; and the unbalance is solved by decentralized cooperative processing of the plurality of demander nodes. This technique is based on the premise that the plurality of demanders can sequentially observe the amount of supply-demand unbalance, but an amount of information that the plurality of demanders can access at the same time is limited due to a network capacity. In addition, such a method that can control the access does not exist.

BRIEF DESCRIPTION OF THE DRAWINGS

FIG. 3 is a diagram illustrating an example of a demander reliability level table;

FIG. 8 is a diagram illustrating another example of the demander reliability level table;

DETAILED DESCRIPTION

According to an embodiment, there is provided a data collecting apparatus including: a data collector, a data history manager, a reliability level calculator, a supply plan data receiver and a data acquisition plan maker.

The data collector collects, from a plurality of demanders, demand record data of energy and demand forecast data of the energy.

The data history manager stores therein the demand record data and the demand forecast data collected by the data collector.

The reliability level calculator calculates, for each demander, a reliability level of the demand forecast data on a basis of the demand record data.

The supply plan data receiver receives an acquisition request of demand forecast data of a future predetermined time range with respect to each demander, from an energy management system that makes an energy supply plan.

The data acquisition plan maker makes a collection plan such that the demand forecast data of the future predetermined time range are collected earlier from a demander with a higher reliability level.

The data collector collects the demand forecast data of the future predetermined time range from each demander according to the collection plan.

The data history manager provides the demand forecast data of the future predetermined time range collected by the data collector to the energy management system before a start time of the future predetermined time range.

Hereinafter, embodiments of the present invention are described with reference to the drawings.

First Embodiment

Figure 1:
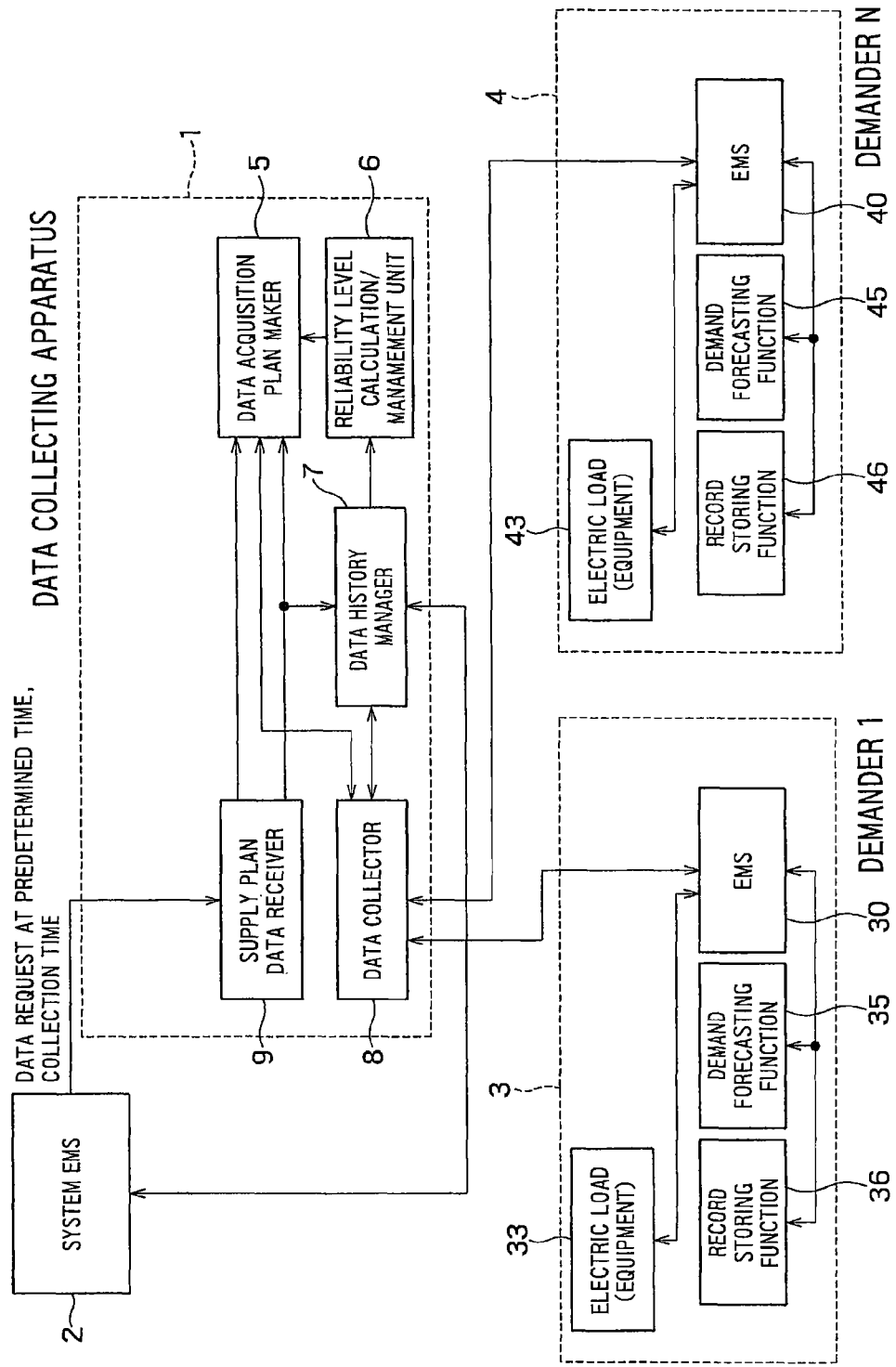
FIG. 1 is a diagram illustrating a system configuration of a first embodiment.

FIG. 1 illustrates a system configuration according to a first embodiment.

The system of FIG. 1 includes: a data collecting apparatus 1 that makes a collection plan of demand data (demand forecast data and demand record data) and collects the demand data according to the collection plan; an upper system energy management system (EMS) 2; and demanders 1 to N. The upper system EMS 2 manages power equipment (for example, a power generating apparatus, a battery, and a load) of this system (power system), and controls energy supply-demand between this system and each demander.

A demand data request for requesting the demand data of each demander and a demand data collection time are issued from the upper system energy management system (EMS) 2 to the data collecting apparatus 1. The demand data request requests demand data in a future predetermined time range, more specifically, demand forecast data in the future predetermined time range and demand record data of current day not yet sent to the EMS 2 etc. The future predetermined time range is a period of time Tw2 from a predetermined time in the future. Also, the demand data request requests that the demand data is obtained at an interval of a predetermined period of time Tw1. The demand data request is issued at an interval of the Tw2, and the demand data collection time is also issued at an interval of Tw2 together with the demand data request. The demand data request and the demand data collection time are received by a supply plan data receiver 9 included in the data collecting apparatus 1, and then are transmitted to a data acquisition plan maker 5.

The data acquisition plan maker 5 makes a plan of data acquisition from each demander such that collection of the pieces of demand data of the demanders corresponding to the period of time Tw2 starting from the predetermined time is completed until the demand data collection time. The data collecting apparatus transmits the collected demand data according to the data collection plan, to the upper system EMS 2 on or in the demand data collection time. The demand data collection time is a time before the predetermined time (the start time of the predetermined time range described above).

A reliability level calculation/management unit 6 calculates a reliability level of the demand forecast data collected from each demander and a data collection cycle of each demander, and manages the calculation results as a demander reliability level table.

In response to the demand data request at the predetermined time, the data acquisition plan maker 5 determines: pieces of demand data (demand forecast data and demand record data) of demanders to be collected; and collection order thereof, on the basis of the reliability level and the data collection cycle of each demander, which are managed by the reliability level calculation/management unit 6, and the data acquisition plan maker 5 thus makes a collection plan.

A data collector 8 acquires, according to the collection order, the pieces of demand data of the demanders to be collected that are determined by the data acquisition plan maker 5, from EMSs 30 to 40 provided in the demanders 1 to N.

A data history manager 7 stores therein the demand data (the demand record data and the demand forecast data) collected from each demander. The data stored in the data history manager 7 is used when the reliability level calculation/management unit 6 calculates the reliability level and the data collection cycle.

The upper system EMS 2 collects the pieces of demand data of the demanders stored in the data history manager 7, at the data collection time reported to the supply plan data receiver 9. Note that, in the case where the data collection is completed before the data collection time designated by the upper system EMS 2, the data history manager 7 may report the completion to the upper system EMS 2, and the data collection by the upper system EMS 2 may be brought forward. The upper system EMS that has collected the demand data implements a power supply plan (or a supply-demand control plan) corresponding to the period of time Tw2 from the predetermined time.

In the present embodiment, the demand data (the demand record data and the demand forecast data) is transmitted to the upper system EMS 2, but only the demand forecast data may be transmitted in response to a request of the upper system EMS 2.

In addition, in the present embodiment, description is given assuming that the demand data is demand data on electric power, but the demand data may be any data such as data on general energy as long as the data relates to a demand for energy that is required by a demander and is supplied from the system.

Here, a relation between the time interval Tw2 of the demand data request from the system EMS 2 and the period of time Tw1 of the requested demand data needs to satisfy the following expression.

$$Tw1 \leq Tw2 \qquad \text{(Expression 1)}$$

In addition, preferably, the relation satisfies that Tw2=Tw1×M (integer), and more preferably, M is set to a power of 2.

Further, the demand data request that is issued by the system EMS 2 for each period of time Tw2 requests the demand data corresponding to the period of time Tw2, and hence the data collecting apparatus needs to prepare the demand forecast data corresponding to M steps at the minimum from the predetermined time, for all the demanders.

Hereinafter, description is given first of the case where the time interval Tw2 of the demand data request itself of the system EMS 2 is equal to the period of time Tw1 of the requested demand data, that is, $M=2^0=1$.

<Making of Data Collection Plan>

FIG. 3 illustrates an example of the demander reliability level table managed by the reliability level calculation/management unit 6.

The demander reliability level table stores therein the reliability level of the demand forecast data and the data collection cycle of each demander.

Figure 4:
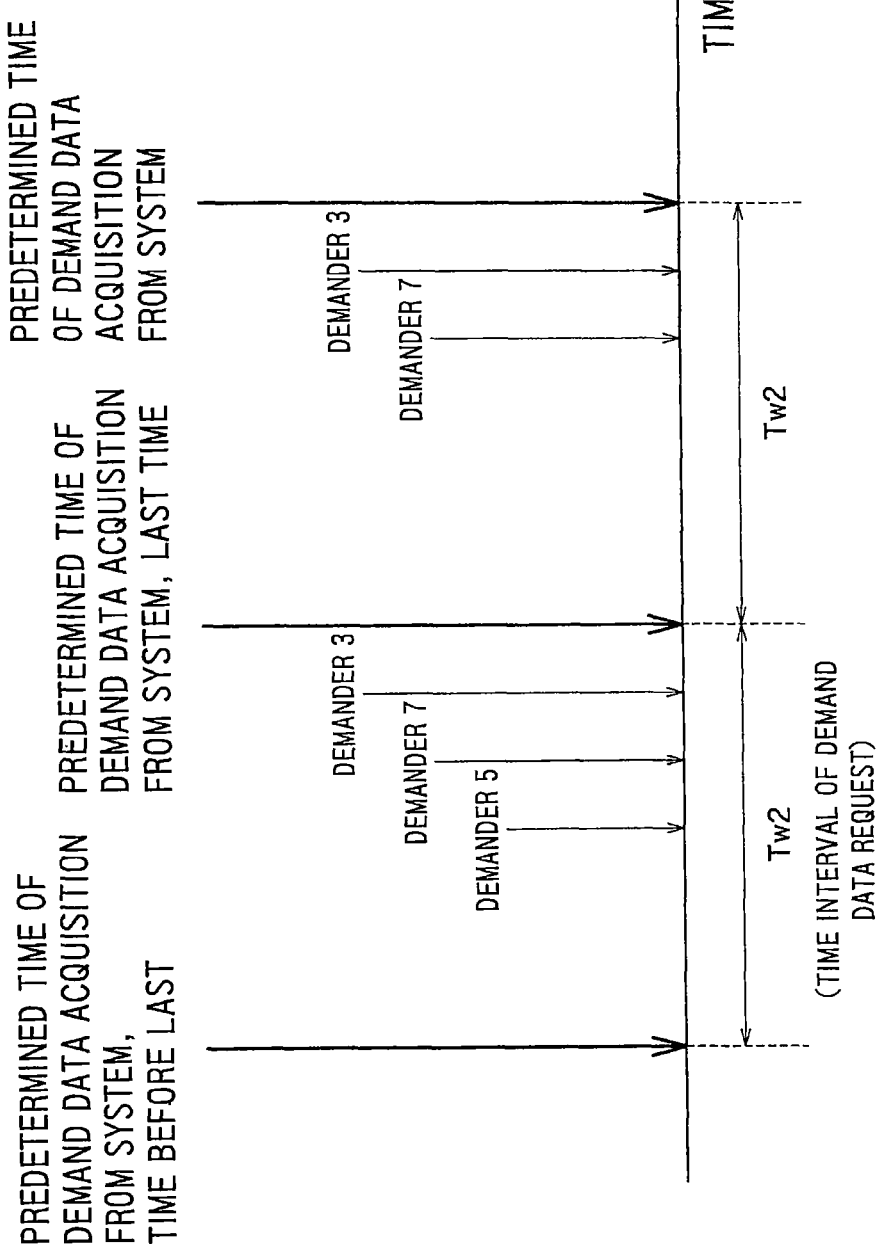
FIG. 4 is a diagram illustrating an example of a data collection plan made by a data collecting apparatus.

FIG. 4 illustrates an example of acquisition timing of the demand data of each demander, the acquisition timing being planned by the data acquisition plan maker 5 on the basis of the table of FIG. 3. As described above, it is assumed that $M=2^0=1$ (that is, Tw2=Tw1). The predetermined period of time Tw1 is set to, for example, 30 minutes.

Figure 2:
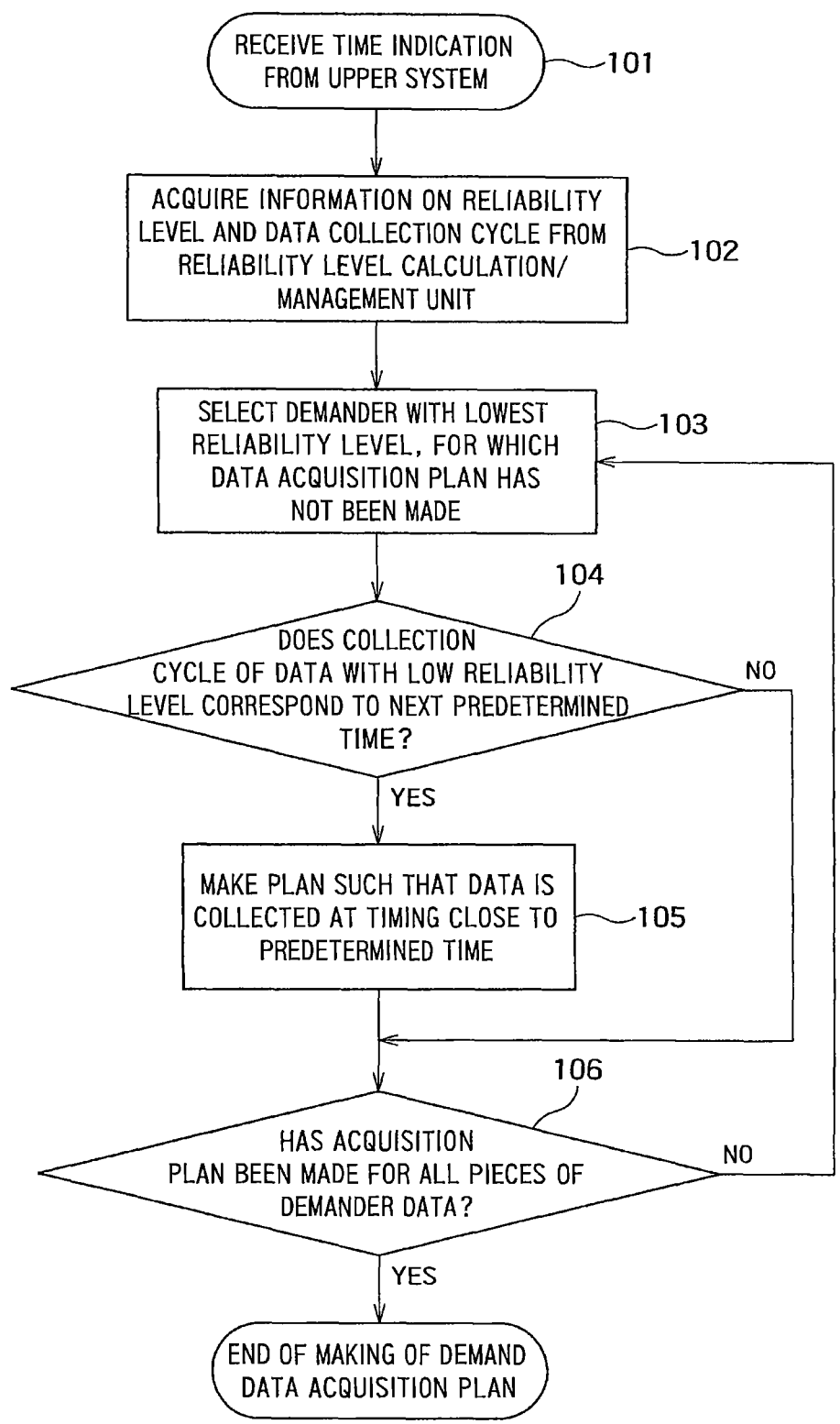
FIG. 2 is a diagram illustrating a processing flow of the first embodiment.

With reference to a flowchart of FIG. 2, a procedure for making the data acquisition plan is described on the basis of the example of FIG. 3 and FIG. 4.

First, the supply plan data receiver 9 of the data collecting apparatus receives the demand data request in which a predetermined time (see a rightmost thick downward arrow of FIG. 4) is designated, from the upper system EMS 2 (Step 101). Then, the data acquisition plan maker 5 acquires the reliability level and the data collection cycle from the reliability level calculation/management unit 6 (Step 102).

Subsequently, a demander with the lowest reliability level, for which the data acquisition plan has not been made, is the demander 3 (Step 103), and hence the data collection cycle of the demander 3 is checked. The data collection cycle of the demander 3 is 1, and the data is collected each time from the demander 3 in a cycle of Tw1 (in the present embodiment, Tw1=Tw2) (Step 104). Accordingly, as illustrated in FIG. 4, the timing at which the data is collected from the EMS of the demander 3 is set to a point closest to the predetermined time (Step 105).

Subsequently, if the data collection cycle of the data of the demander 7 with the second lowest reliability level is checked (Step 104), the data collection cycle thereof is 1. Hence, as illustrated in FIG. 4, such a plan that collects the demand data from the EMS of the demander 7 is made immediately before the data collection from the demander 3 (Step 105).

In addition, if the data collection cycle of the demander 5 with the third lowest reliability level is checked, the data collection cycle thereof is 2, and the data is collected there-from 30 minutes (that is, the predetermined period of time Tw1) before. Hence, the data is not collected from the demander 5 this time, and the demand data collected 30 minutes before is used without any change. Note that, in the present embodiment, the period of time Tw2 of the demand data request is equal to Tw1, and hence the data that has already been sent to the upper system EMS 2 is used as the demand data of the demander 5. In short, the plan is made in the following manner: the data collection cycle is checked in order from a demander with a lower reliability level; demanders from each of which the demand data is to be collected are determined; and the pieces of demand data of the determined demanders are sequentially acquired in order of the reliability level at the predetermined time. Because the cycle of data collection from a demander with a higher reliability level is made longer, a reliably larger amount of data of a demander with a lower reliability level is collected accordingly. Consequently, even if the period of time Tw2 is made shorter, an efficient supply plan with a high reliability as a whole is possible for the system EMS. Accordingly, the power supply plan of the upper system can be made with a high reliability. That is, the supply plan with a high reliability corresponding to the period of time Tw2 can be implemented by the system EMS 2 at a point of the predetermined time.

Note that, in the present embodiment, the pieces of demand data are collectively transmitted to the upper system EMS at the data collection time, but the demand data may be transmitted to the upper system EMS in order from a demander the data collection from which has been completed. In this case, data with a higher reliability is more preferentially (earlier) transmitted to the upper system EMS, whereby the upper system can gradually implement a supply-demand plan with a high reliability at an earlier stage.

Note that description is given later of an operation in an initial state in which the reliability level and the collection cycle of the data of each demander do not exist. Description is also given later in detail of a method of calculating the reliability level and the collection cycle.

<Generation of Demand Data by Demander EMS>

In each demander (hereinafter, the demander N is taken as an example), a record storing function 46 of the demander N stores a demand (consumed power) that has actually occurred in the past, for each predetermined period of time Tw1.

The EMS 40 of the demander N obtains, for each predetermined period of time Tw1, the total amount of demand from the predetermined time on the basis of patterns of the past demands stored in the record storing function 46, in cooperation with a demand forecasting function 45. The demand forecasting function 45 forecasts a demand of each predetermined period of time Tw1 from the predetermined time.

Figure 5:
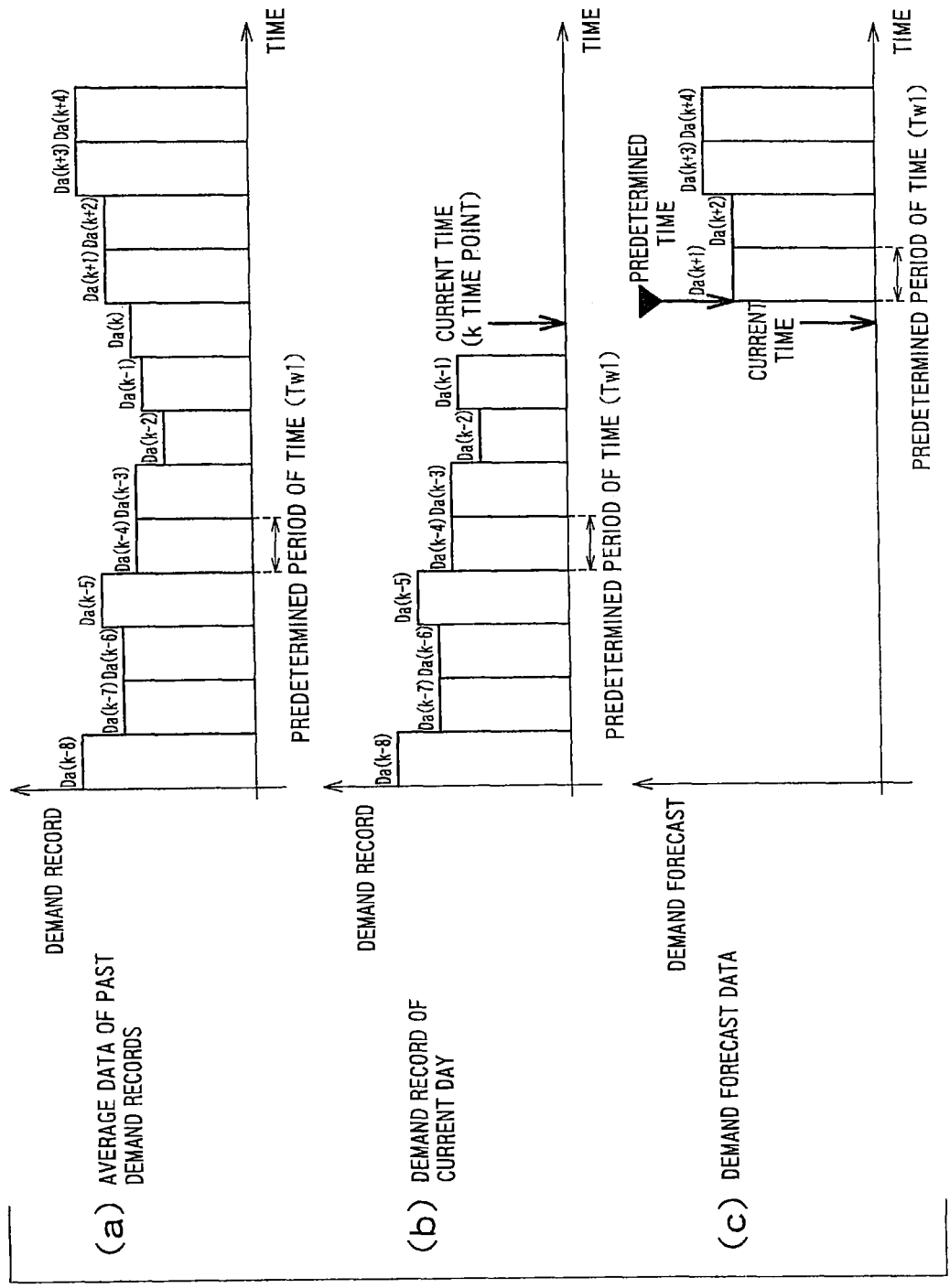
FIG. 5 are diagrams illustrating an example of a demand forecast by an EMS.

FIG. 5 illustrate an example of the demand forecast.

First, an average value of pieces of demand data of the same days of the week as that of a current day is calculated as average data Da (FIG. 5(a)) of the past demand records, from the pieces of past demand data stored in the record storing function 46 of the demander N. At this time, the average value may be corrected with a variable that significantly affects the demand, such as temperature of the current day, whereby the average data Da may be calculated.

Subsequently, the calculated data is compared with n pieces (for example, n pieces immediately before the current time) of demand record data Dr of the current day (FIG. 5(b)), and a correction coefficient Cp for forecasting is determined. Assuming that n=8, Cp can be obtained by Expression 2 given below. This expression is used to calculate an average value of a ratio of the average data of the past demand records to the demand record data of the current day.

$$Cp = \frac{1}{8}\sum_{i=1}^{8} Dr(k-i)/Da(k-i)$$ (Expression 2)

With the use of the correction coefficient Cp thus obtained, demand forecast data Dp from the predetermined time (FIG. 5(c)) is obtained in the following manner.

$$Dp(k+1)=Cp \times Da(k+1)$$ (Expression 3)

In this way, the EMS 40 of the demander N acquires the demand data of the demander N, and transmits the demand forecast data Dp and the record data Dr of the demander N corresponding to the predetermined period of time Tw1, in response to a request from the data collector 8 of the data collecting apparatus. Note that, in the present embodiment, according to Expression 2 and Expression 3, the correction coefficient is calculated for forecasting on the basis of the ratio of the average data of the past demand records to the demand record data of the current day, but this is given as an example. Alternatively, the correction coefficient may be calculated on the basis of, for example, a difference between the average data of the past demand records and the demand record data of the current day, and the forecast may be made using the correction coefficient thus calculated. That is, the forecasting method itself is not the essence of the present embodiment, and any method may be used.

Figure 6:
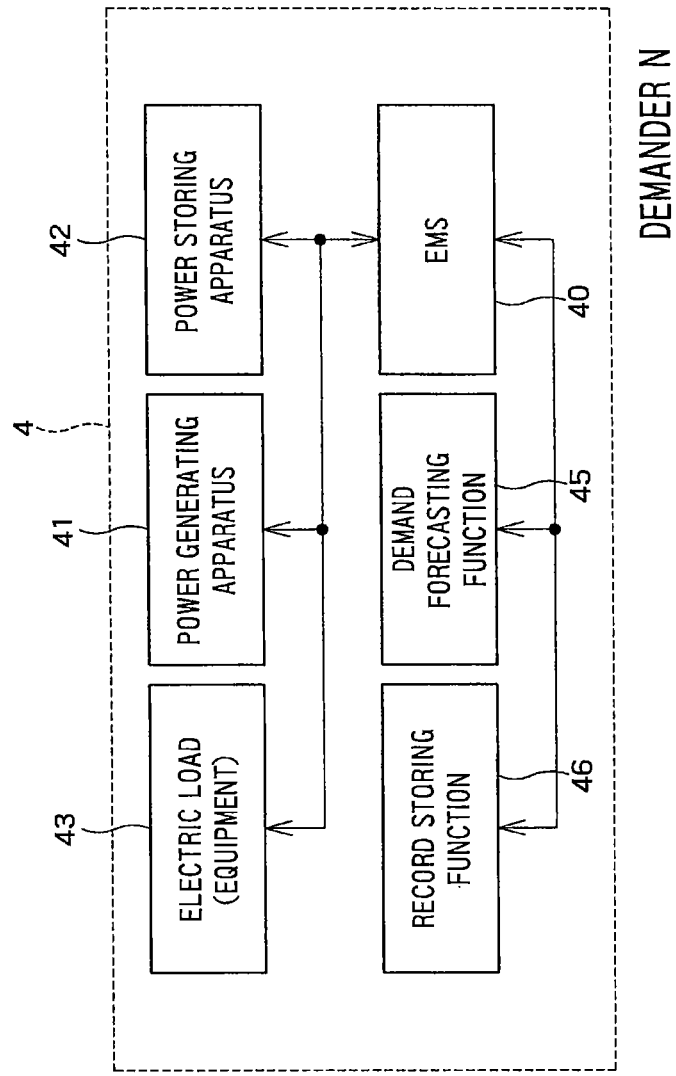
FIG. 6 is a diagram illustrating a configuration example of the EMS.

In addition, as illustrated in FIG. 6, the demander N may include a power generating apparatus 41 and a power storing apparatus 42. In this case, if each of the power generating apparatus 41 and the power storing apparatus 42 can be used to deal with the demand of the demander N, the EMS 40 and the demand forecasting function 45 of the demander N may calculate an amount of demand of each predetermined period of time from the predetermined time, with the use of: an amount of power generated by the power generating apparatus 41; and an amount of chargeable electricity and an amount of dischargeable electricity of the power storing apparatus 42. That is, the demand may be forecast with an amount of electric power that can be obtained within the demander being subtracted, to be transmitted to the data collecting apparatus. At this time, the demand record data represents electric power that is actually supplied from the system to the demander N, and hence record data of the electric power that is supplied from the system to the demander N is stored in the record storing function 46.

<Calculation of Reliability Level and Data Collection Cycle>

As described above, the data collecting apparatus collects the demand forecast data Dp of the predetermined period of time of the demander N and the record data Dr in the past (of the current day), according to the plan created on the basis of the demander reliability level table (FIG. 3). In the initial state, however, the data (the reliability level and the data collection cycle) of the demander reliability level table does not exist. Description is given below of modes of a method generating and a method of updating the demander reliability level table by the reliability level calculation/management unit 6.

In the initial state, all pieces of demand record data and demand forecast data are collected from the EMS of each demander in order from the demander 1 to the demander N, and the reliability level is calculated for each demander.

The reliability level represents the accuracy of a forecast for a record. Assuming that the reliability level of the demander N is $R_N$, $R_N$ can be calculated by Expression 4 given below as an example of the method of calculating the reliability level. A value of j is set to a predetermined value, and the reliability level is calculated at a time point k after acquiring record data j times. As a value of $R_N$ is larger, the reliability level is higher. According to Expression 4, the reliability level is calculated as a value that is proportional to the reciprocal of a square error between the record and the forecast. Note that Kr in Expression 4 is a value that is set in advance as a reference value for normalizing the reliability level.

$$R_N = Kr / \sqrt{\Sigma_{m=1}^{j}(Dp(k-m)-Dr(k-m))^2}$$ (Expression 4)

The reliability level $R_N$ thus obtained is compared with a reference value RI. In the case where the reliability level $R_N$ is larger than RI, j is adopted as the data collection cycle of the demand data. On the other hand, in the case where the reliability level $R_N$ is smaller than the reference value RI, the collection cycle of the demand data is shortened such that the reliability level $R_N$ is larger than RI. Here, it is preferable that an initial value of j be a power of 2 and be a value sufficiently larger than a value of $2^M$.

For example, assuming that $M=2^0=1$, in the case where the value of j is 8 and where the reliability level $R_N$ is smaller than RI, the value of j is set to 4, which a half of 8, and the reliability level $R_N$ is recalculated. Even after that, in the case where the reliability level $R_N$ is still smaller than RI, the reliability level $R_N$ is repeatedly recalculated until j becomes M (Tw2=Tw1×M (integer); here, 1).

The demander data is collected on the basis of the demander reliability level table including the reliability level and the data collection cycle that are determined as described above.

Note that description is given here of the example in which the demand forecast data (the data forecast using the record) is collected from each demander, but demand scheduled data (a scheduled amount of use for the demand of each demander), which is announced by the EMS of each demander, may be collected instead of the demand forecast data.

The data collection cycle of the demander reliability level table is updated in accordance with the reliability level calculated for each collection timing of the demander data. Upon collection of the demand data, the reliability level can be updated by Expression 4. In the case where the updated reliability level $R_N$ is smaller than RI, the data collection cycle is also updated. In addition, in the case where the reliability level $R_N$ becomes, for example, 8 times or higher as a result of the update, a change in the data collection cycle is transmitted to the EMS of the demander N in order to calculate the reliability level again with the data collection cycle being doubled.

<Case where Reliability Level Calculating Function is Provided to Demander>

Figure 7:
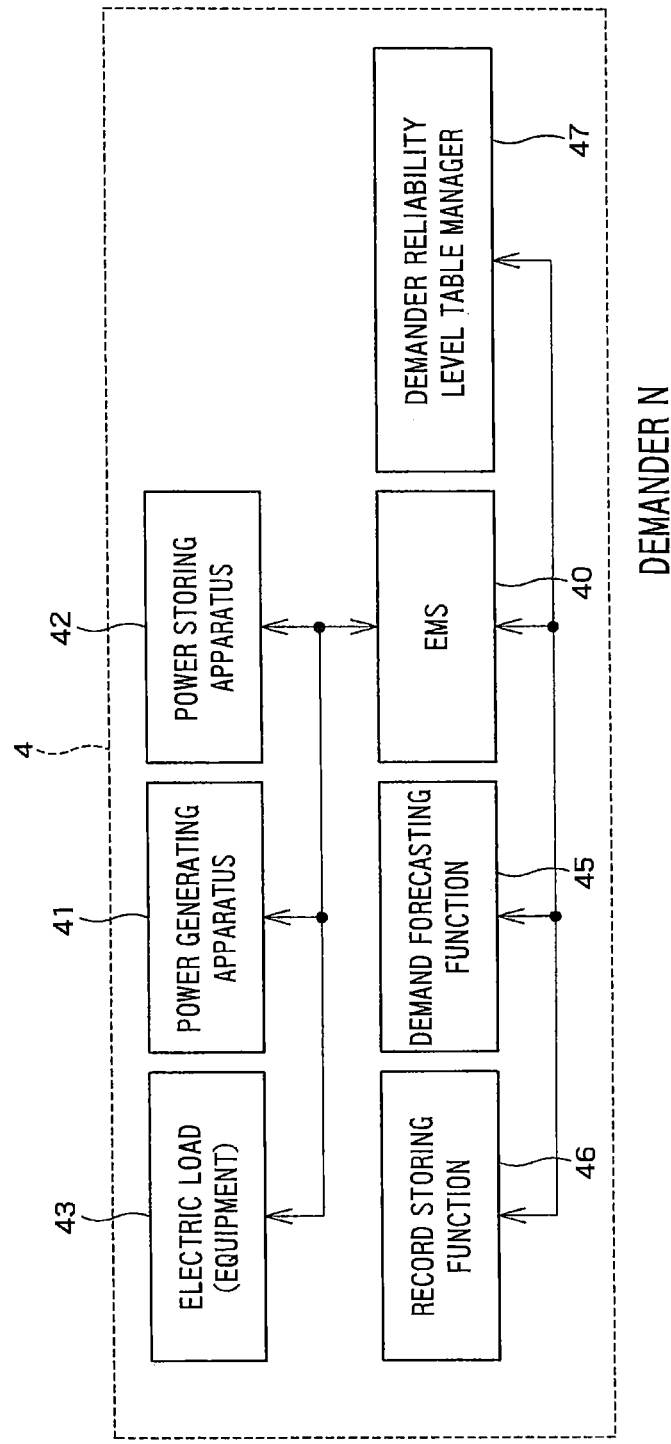
FIG. 7 is a diagram illustrating another configuration example of the EMS.

Note that, as illustrated in FIG. 7, such a function of calculating the reliability level and the data collection cycle as described above may be provided to the demander N as a demander reliability level table manager 47. In this case, the demander reliability level table is created in the demander. That is, the demander reliability level table manager 47 of the demander N calculates the reliability level according to Expression 4, and sequentially updates and manages the demander reliability level table together with the data collection cycle. In addition, in response to a request from the data collector 8 of the data collecting apparatus, information of the demander reliability level table is provided as needed from the EMS of the demander N to the data collector 8. The provided information is stored in the reliability level calculation/management unit 6 through the data history manager 7.

Figure 9:
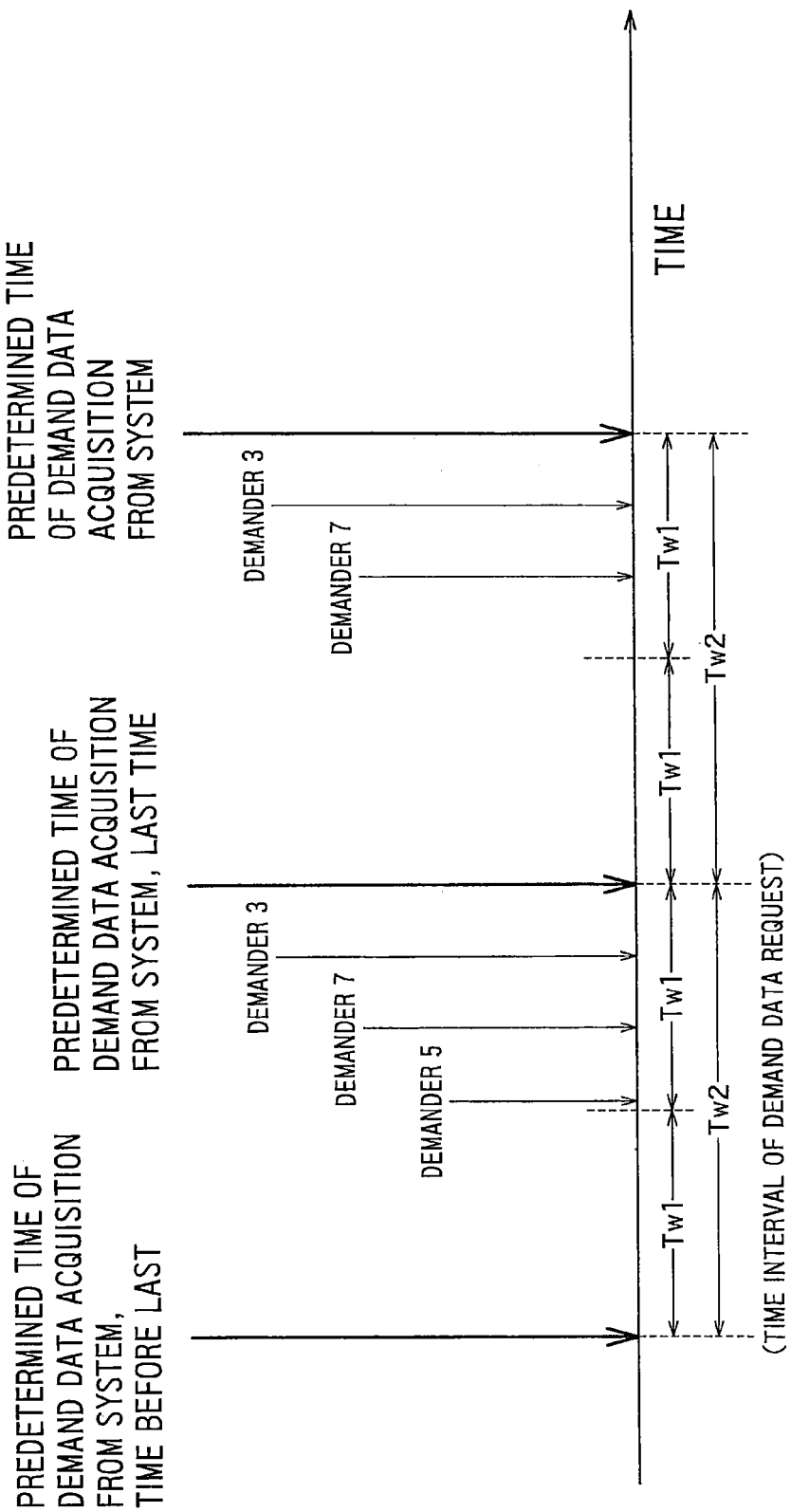
FIG. 9 is a diagram illustrating another example of the data collection plan made by the data collecting apparatus.

According to another mode of the first embodiment, in the case where $M=2^1=2$ (Tw2=Tw1×2), the demander reliability level table is as illustrated in FIG. 8. As illustrated in FIG. 9, a data acquisition plan of this mode is the same as that in the case where M=1. As illustrated in FIG. 8, the shortest data collection cycle is 2 (=M) or more.

<Case of Cooperation with Supply Plan Making>

Figure 14:
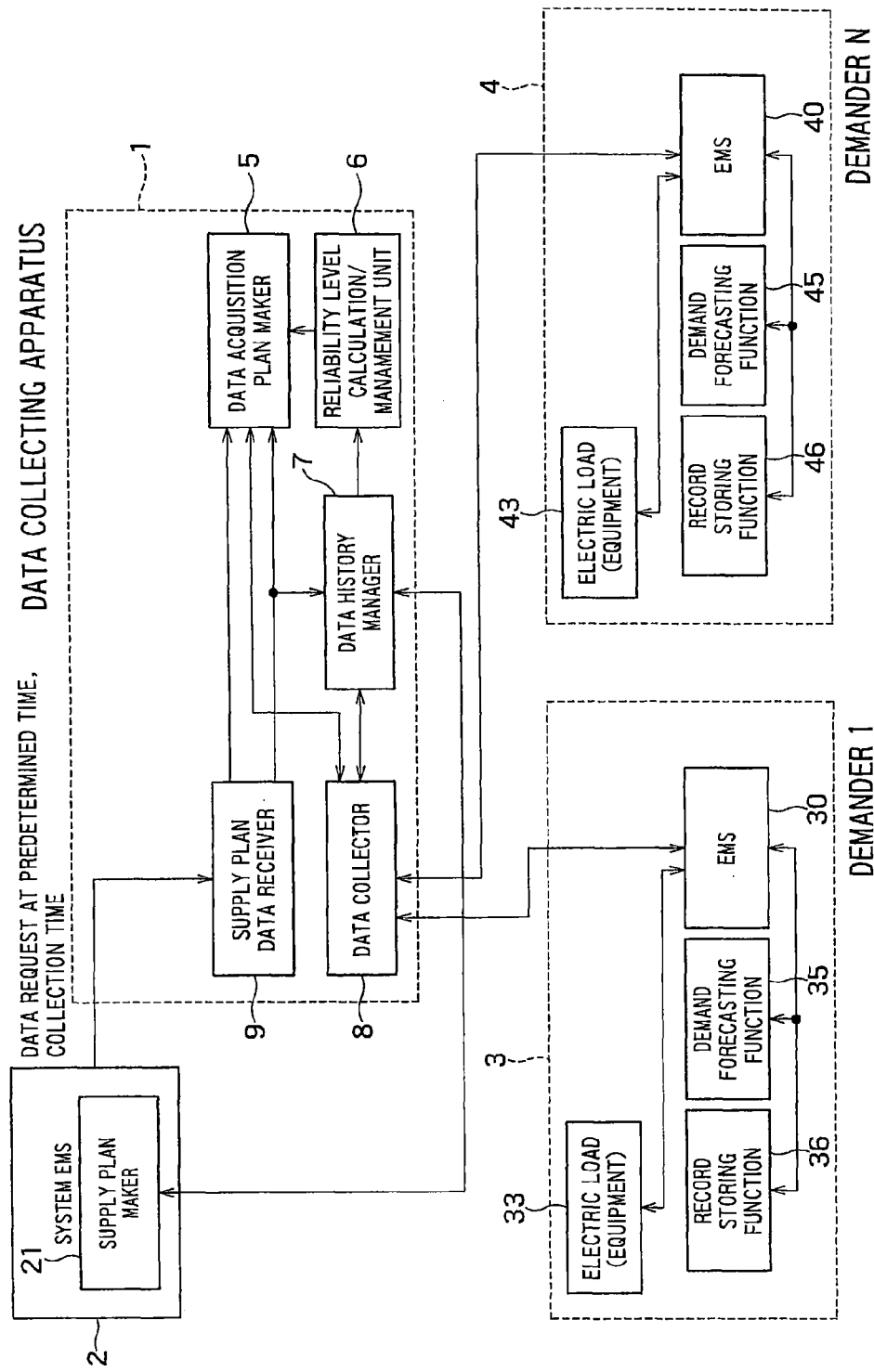
FIG. 14 is a diagram illustrating another configuration example of the system of the first embodiment.

FIG. 14 illustrates an example in which the data collecting apparatus of the present embodiment is caused to cooperate with a supply plan maker 21 of the system EMS. According to this example, pieces of demand data from the predetermined time are used in descending order of the reliability level, and the demands from the predetermined time can be sequentially determined, so that a prompt and effective supply plan can be made.

Figure 15:
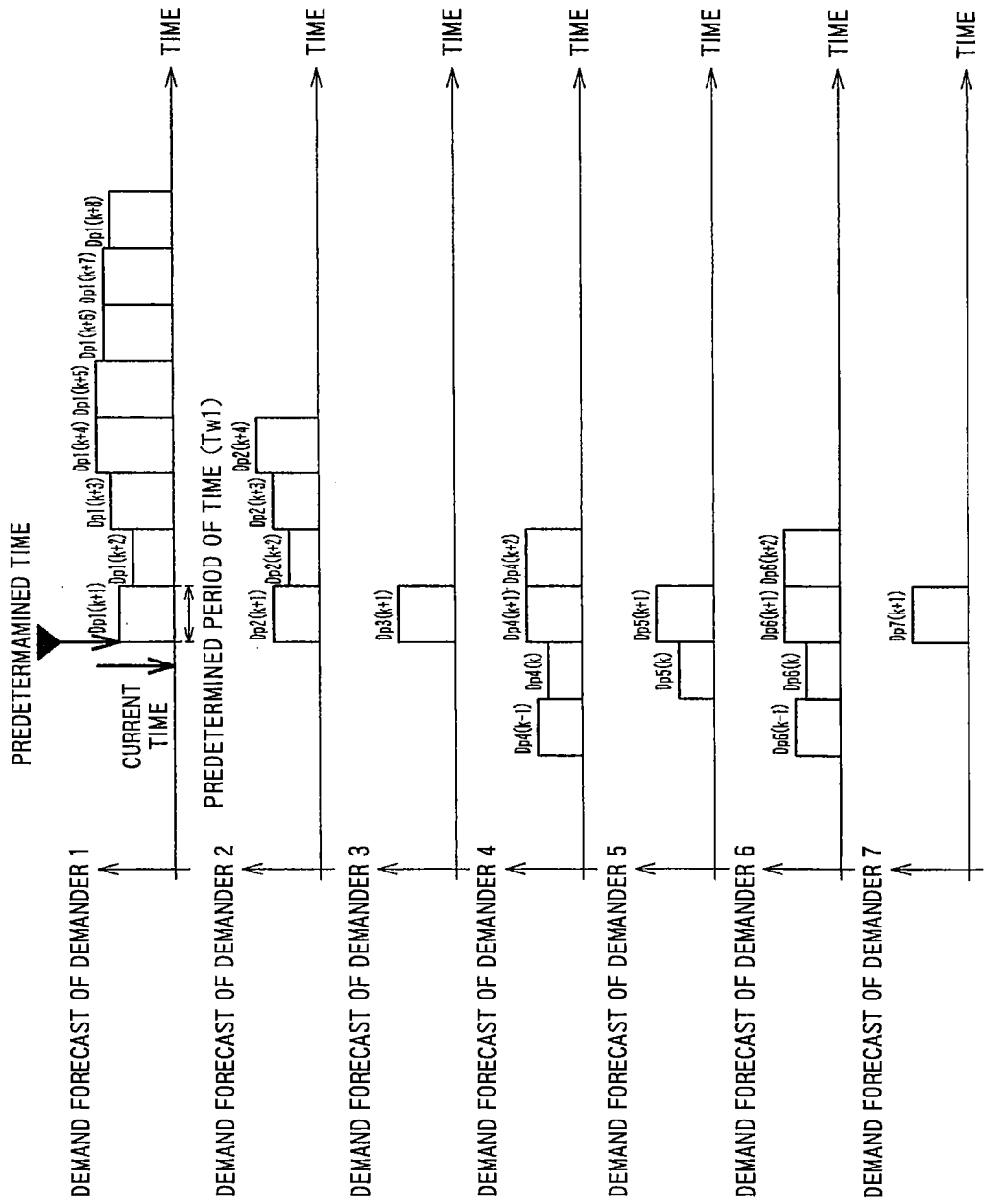
FIG. 15 is a diagram illustrating a cooperation with a supply plan maker of the system EMS.

Specifically, it is assumed as illustrated in FIG. 15 that, at a given timing (a current time in FIG. 15), pieces of demand forecast data of the demander 1 to the demander 7 have been collected according to the demander reliability level table of FIG. 3. In this case, the supply plan can be made for a step of (k+1) with the use of the pieces of demand forecast data of all the demanders.

In addition, for a step of (k+2), because pieces of demand forecast data of the demander 1, the demander 2, the demander 4, and the demander 6 have been acquired, part of the demands can be known ahead, thus achieving effective making of a prompt supply plan and effective determination of excess or lack in supply.

Figure 16:
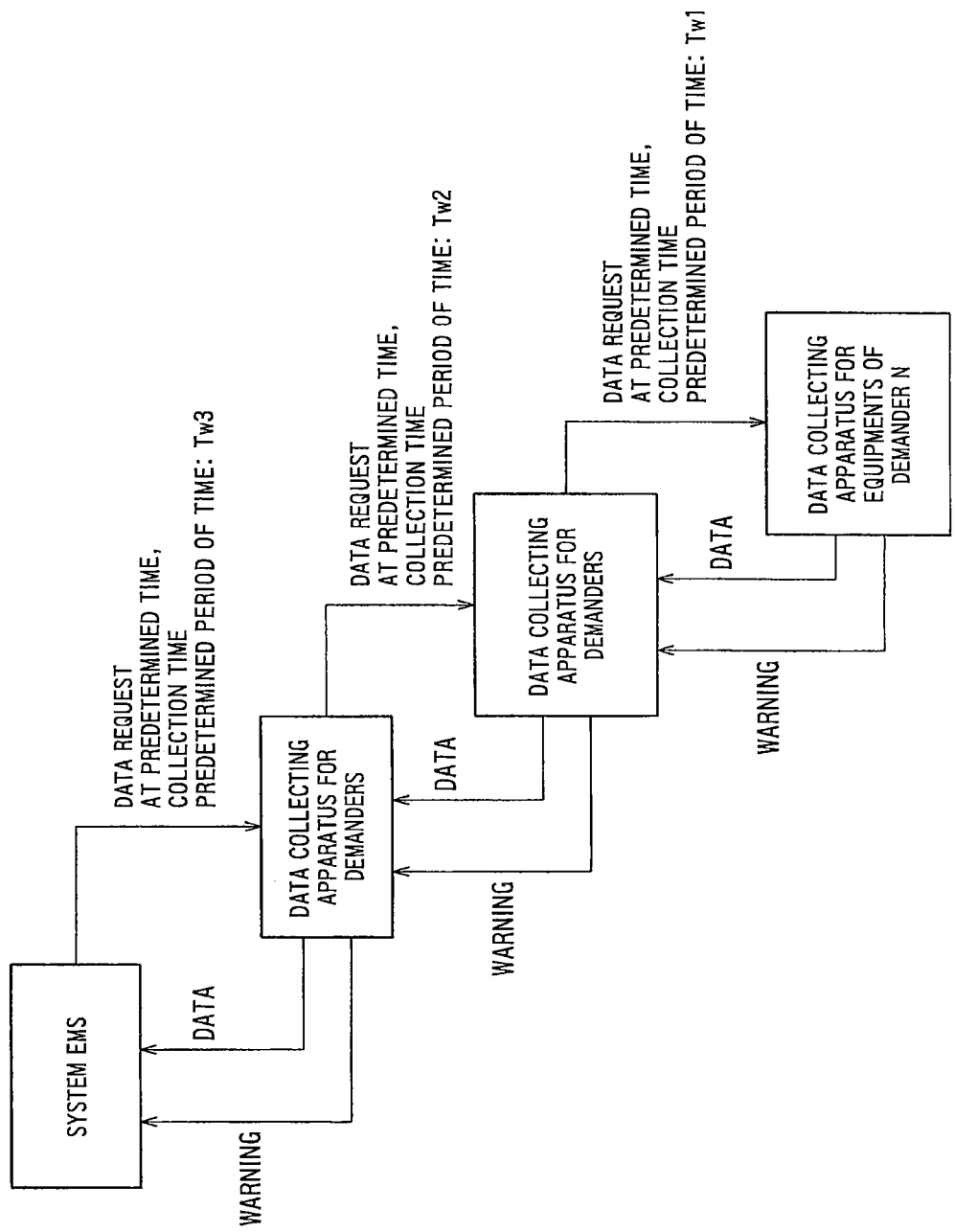
FIG. 16 is a diagram illustrating a system configuration in which data collecting apparatuses are hierarchically connected to one another.

In addition, as illustrated in FIG. 16, the predetermined period of time is set to such values that become gradually larger, for example, Tw1, Tw2, and Tw3, which easily enables hierarchical connection of the data collecting apparatuses ("WARNING" in FIG. 16 is described in a second embodiment). At this time, a relation among the time intervals Tw1, Tw2, and Tw3 is as follows.

$$Tw1 \leq Tw2 \leq Tw3$$

In addition, preferably, the relation satisfies that Tw2=Tw1×M1 (integer) and Tw3=Tw2×M2 (integer), and more preferably, M1 and M2 are each set to a power of 2.

Second Embodiment

Description is given of an example as the second embodiment in which: in the case where the demand forecast data forecast by the demand forecasting function of the demander N is significantly different from the record, a warning is given to the data collecting apparatus; and the data collection plan is changed. For example, the following case is discussed. That is, for each demander whose data collection cycle in the demander reliability level table (FIG. 3) is not 1, the data of such a demander is not acquired even when the demand data request is received from the system EMS, and the past forecast data is used instead. In this case, if the record data that is significantly different from the forecast data is obtained, in the present embodiment, a warning is given to the data collecting apparatus, and the data collection plan is modified.

Figure 10:
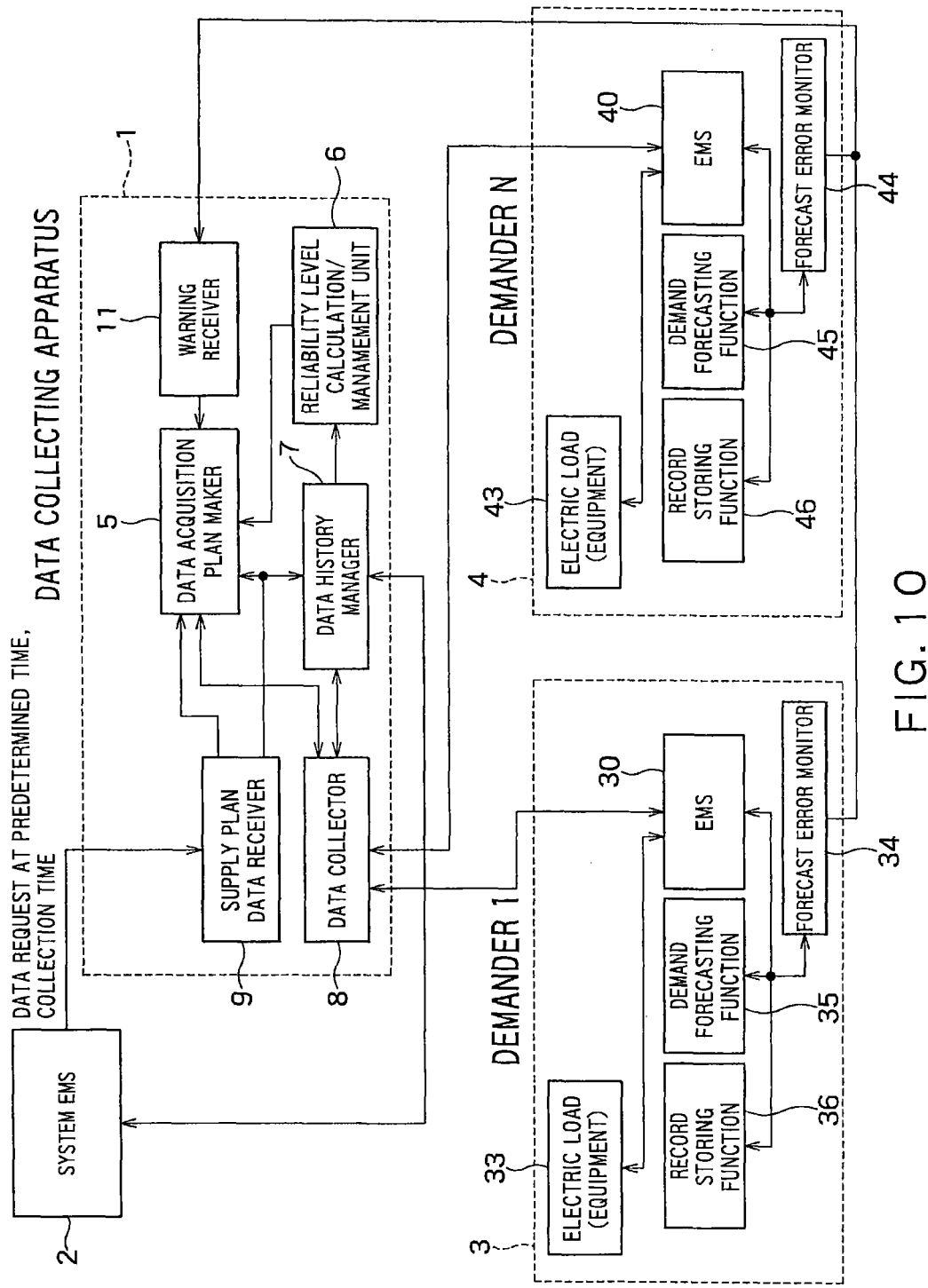
FIG. 10 is a diagram illustrating a system configuration of a second embodiment.

FIG. 10 illustrates a system configuration according to the present embodiment.

The demanders 1 to N are respectively provided with forecast error monitors 34 to 44. The data collecting apparatus is provided with a warning receiver 11.

The forecast error monitor 44 of the demander N compares the demand forecast data forecast by the demand forecasting function 45 of the demander N with the demand record data stored in the record storing function 46 of the demander N, and calculates and monitors a forecast error.

The forecast error monitor 44 calculates as an error a difference between the demand forecast data and the record data. In the case where an absolute value of the calculated error exceeds a predetermined value, a warning is given to the warning receiver 11 of the data collecting apparatus.

As an example, in the case as illustrated in FIG. 5(c) where a given demander has made a demand forecast for 4 steps, each time the record data is obtained as Dr(k+1), Dr(k+2), Dr(k+3), or then Dr(k+4), the obtained record data is compared with corresponding one of Dp(k+1), Dp(k+2), Dp(k+3), and Dp(k+4) that are forecast in advance.

For example, assuming that |Dr(k+1)−Dp(k+1)| that is the absolute value of the difference exceeds the predetermined value at a timing of (k+1) at which the record data Dr(k+1) is obtained, a warning is given to the warning receiver 11 of the data collecting apparatus. At the same time, the record data after k+1, for example, the pieces of forecast data Dp(k+3) and Dp(k+4) are corrected with reference to the record data.

Figure 11:
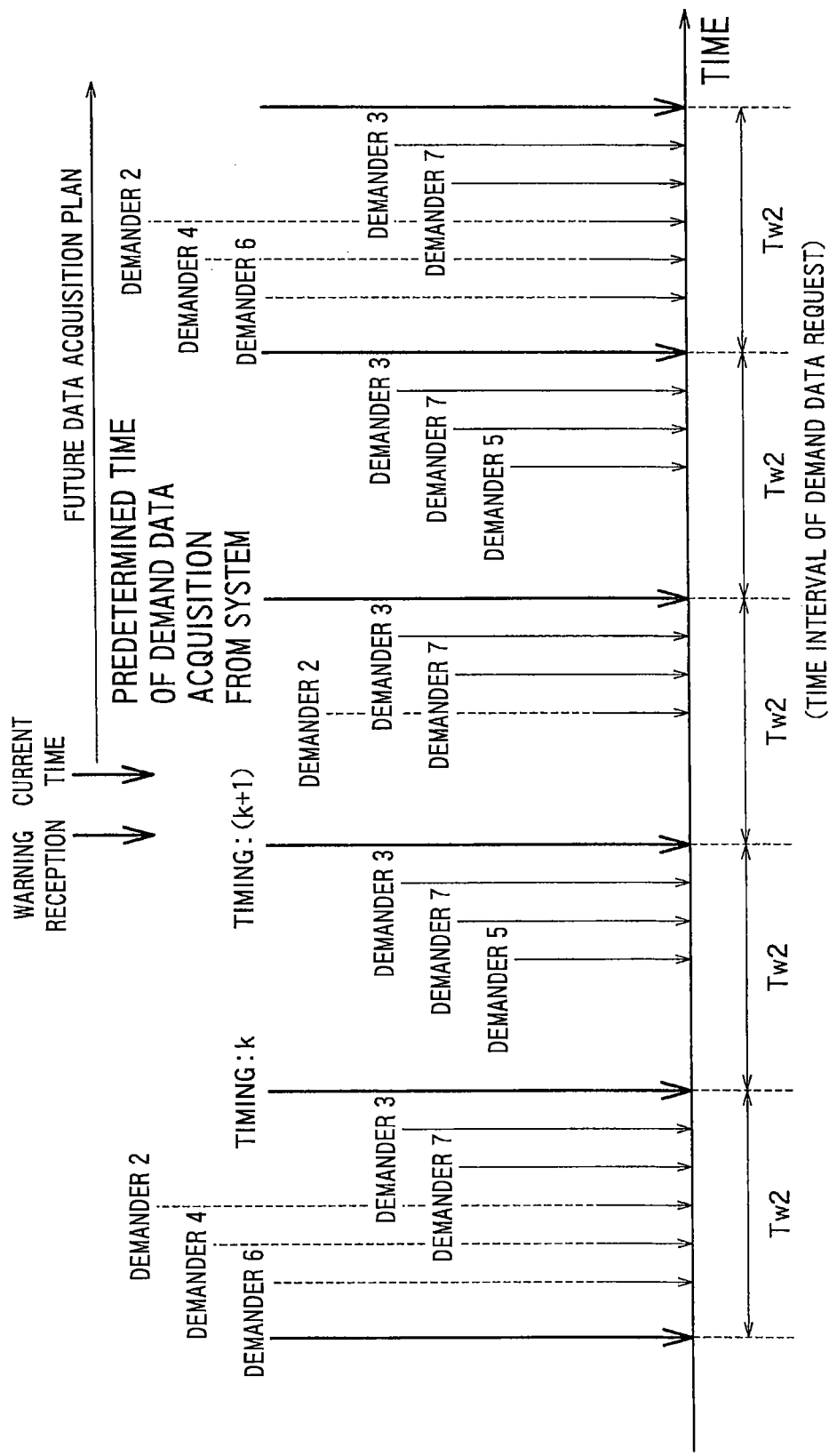
FIG. 11 is a diagram illustrating an example of a data collection plan made by a data collecting apparatus of the second embodiment.

FIG. 11 illustrates results of plan making in response to the demand data request from the system EMS at a timing of (k+2), in the case where the given demander is the demander 2 in the demander reliability level table of FIG. 3.

A warning to the effect that the record data of the demander 2 is significantly different from the forecast result is received immediately after the timing of (k+1), and the plan is modified such that the demand data of the demander 2 is acquired before the next demand data acquisition time. An acquisition plan for the demand data of the demander 2 that is supposed to be acquired 2 steps later is kept as it is without any change.

Figure 12:
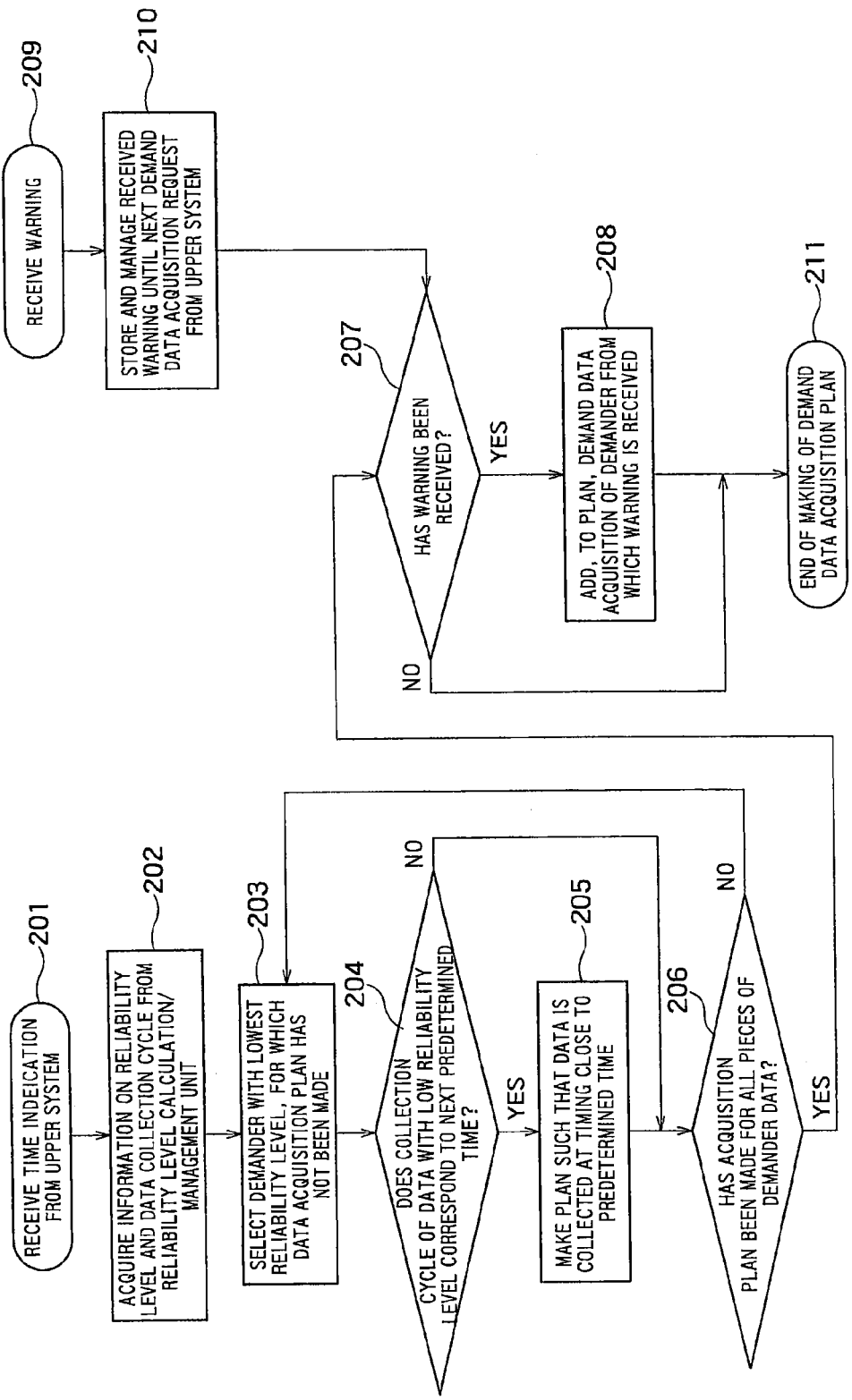
FIG. 12 is a diagram illustrating a processing flow of the second embodiment.

FIG. 12 illustrates a processing flow according to the present embodiment. Processing from Step 201 to Step 206 is the same as that illustrated in FIG. 2. In the present embodiment, in the case where a warning is received before the demand data request is received from the upper system (Step 209, Step 210, and Step 207), such a plan that acquires the demand data of a demander from which the warning is received is added to a data acquisition plan created similarly to the first embodiment (Step 208).

Third Embodiment

Description is given of an example as a third embodiment in which: in the case where a demander not including a record storing function, a demand forecasting function, and an EMS exists among the demanders, the data collecting apparatus makes a demand forecast for the demander.

Figure 13:
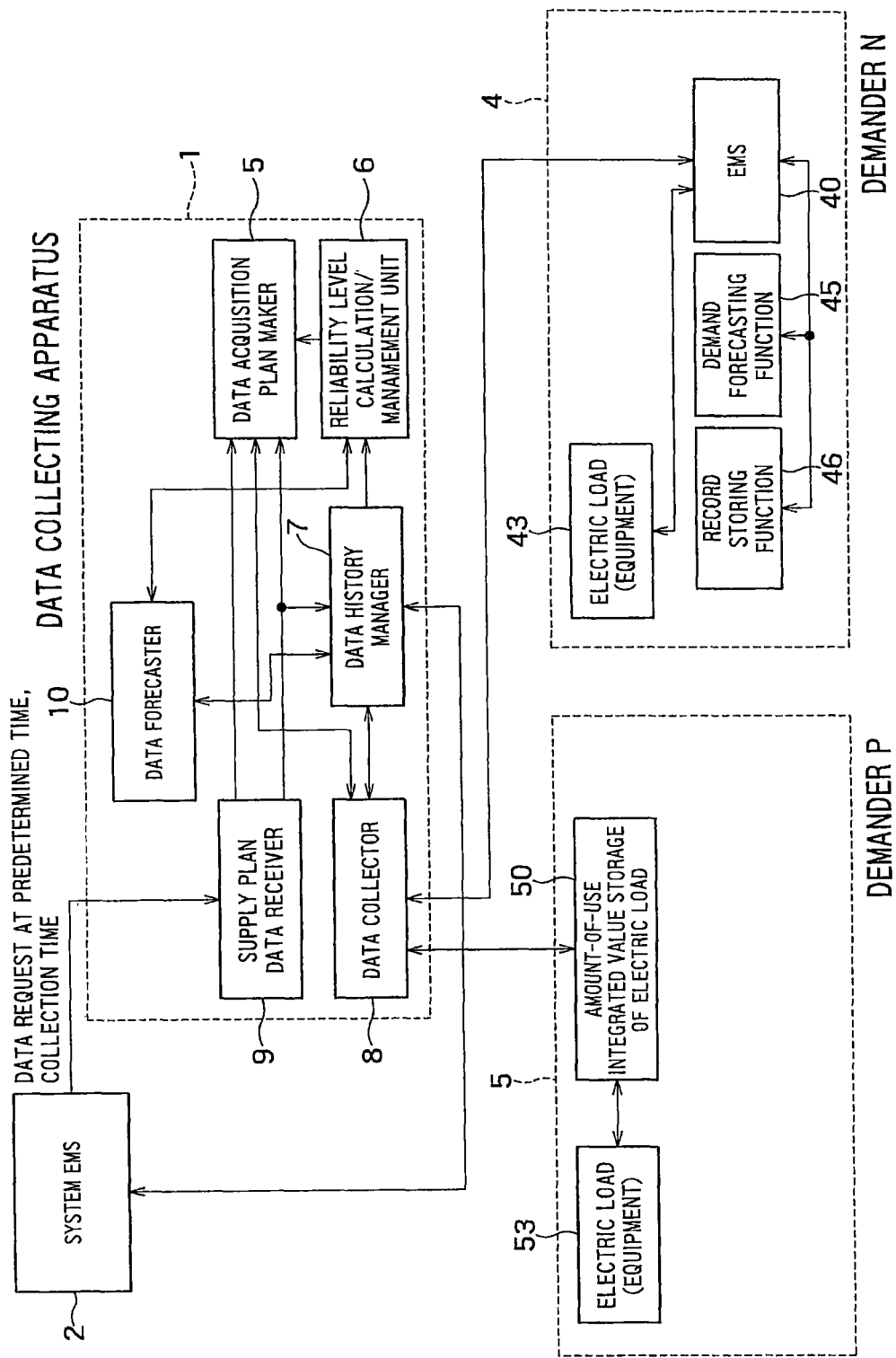
FIG. 13 is a diagram illustrating a system configuration of a third embodiment.

FIG. 13 illustrates a system configuration according to the present embodiment.

A demander P is provided with: an electric load 53; and an amount-of-use integrated value storage 50 of the electric load. The demander P is not provided with the record storing function, the demand forecasting function, and the EMS. The demander N has the same configuration as that of FIG. 1. A data forecaster 10 is added to the data collecting apparatus.

The amount-of-use integrated value storage 50 of the demander P may be an apparatus that can store therein an integrated value of the amount of used electric power, for example, an electric power meter. The data acquisition plan maker 5 recognizes in advance that the demander P not including the EMS exists.

The data collector 8 of the data collecting apparatus directly collects, for each predetermined time, the integrated value of the amount of use from the amount-of-use integrated value storage 50 of the electric load, and acquires a difference between the integrated values, as demand record data of the predetermined period of time. The data history manager 7 stores and manages the demand record data. After collection of a predetermined number of pieces of demand record data, the data forecaster 10 performs a process similar to the demand forecasting function of each demander, and generates demand forecast data as illustrated in FIG. 5(c). In addition, the reliability level calculation/management unit 6 calculates the reliability level and the data collection cycle of the demander P from the forecast data generated by the data forecaster 10, and manages the calculation results as a reliability level table of the demander P.

Fourth Embodiment

In the present embodiment, a restrainable amount of demand is calculated by the demand forecasting function of each demander, a demand restraint command is issued from the system EMS in accordance with the calculated restrainable amount of demand, and a record thereof is stored in the record storing function of the demander. In the present embodiment, the data collecting apparatus collects not only the demand data but also the restrainable amount of demand of each demander for demand restraint (demand response).

Figure 17:
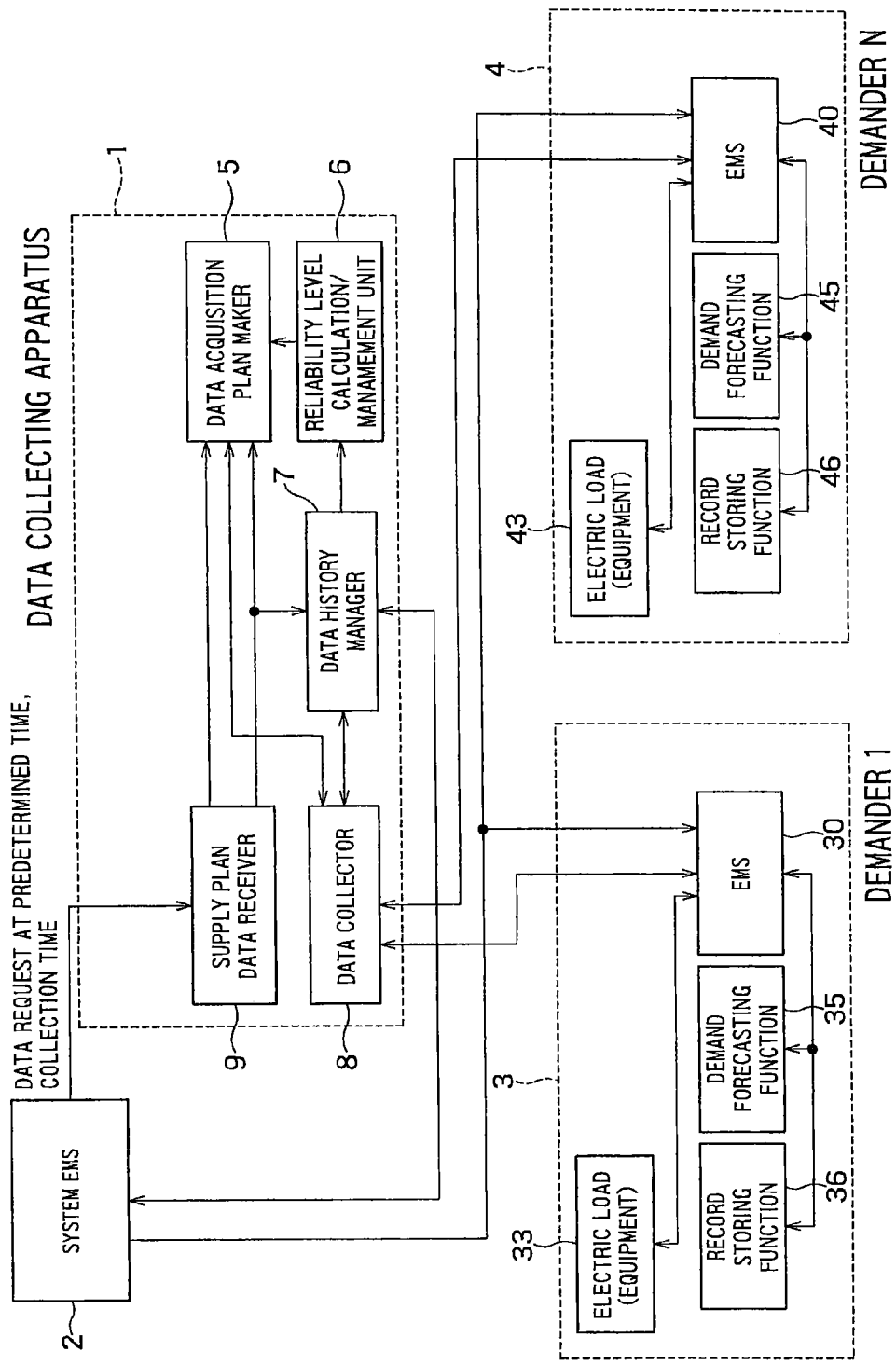
FIG. 17 is a diagram illustrating a system configuration of a fourth embodiment.

FIG. 17 illustrates a system configuration according to the present embodiment. The configuration of FIG. 17 is different from that of FIG. 1 in that the demand restraint command is issued from the system EMS 2 to the demander EMS and that a signal line exists for transmitting the demand restraint command. With this configuration, the demand restraint command is accurately issued from the system EMS 2, whereby effective demand restraint can be expected. Note that the demand restraint command from the system EMS may be directly inputted to the electric load (equipment) 43 of the demander instead of the demander EMS.

The demand forecasting function 45 of the demander N has a function of calculating the restrainable amount of demand, and a demand restraint record corresponding to the demand restraint command is stored in the record storing function 46.

The data collector 8 of the data collecting apparatus collects the restrainable amount of demand and the demand restraint record, and the data history manager 7 stores the same therein. The reliability level calculation/management unit 6 obtains the reliability level of the restrainable amount of demand for each demander, and obtains the collection cycle of the restrainable amount of demand and the demand restraint record data, to thereby make a demander reliability level table.

The reliability level and the collection cycle here may be calculated in a manner similar to that of the reliability level and the collection cycle for the demand data.

Here, the restrainable amount of demand of each demander can be obtained as an amount of excess in the forecast demand of the current day compared with a normal demand (an average of past records) when a value of Cp in (Expression 2) is larger than 1. The amount of excess can be calculated according to Expression 5 given below, and is defined as a restrainable amount of demand Ddr.

$$Ddr(k+1)=(Cp-1)\times Da(k+1) \quad \text{(Expression 5)}$$

Meanwhile, the demand restraint record can be obtained as a difference between the amount of demand forecast and the demand record. Assuming that the demand restraint record is Ddr_r, the demand restraint record Ddr_r can be calculated according to Expression 6 given below using an actual demand Dr(k) and an amount of demand forecast Dp(k) calculated according to (Expression 3).

$$D_{dr\_r}=Dp(k)-Dr(k) \quad \text{(Expression 6)}$$

In addition, the reliability level of the restrainable amount of demand can be calculated according to Expression 7 given below. Expression 7 is obtained by replacing Dp(k) in Expression 4 with a restrainable amount of demand Ddr(k) and replacing Dr(k) with a demand restraint record Ddr_r(k).

$$R_{N\_}{}^{dr} = Kr1/\sqrt{\Sigma_{m=1}{}^{j}(Ddr(k-m)-Ddr\_r(k-m))^2} \quad \text{(Expression 7)}$$

Because the reliability level of the restrainable amount of demand is obtained according to Expression 7, the data collection cycle can also be determined.

Note that, similarly to the third embodiment, also in the present embodiment, the demand forecasting function for calculating the restrainable amount of demand may be provided as the data forecaster in the data collecting apparatus.

The data collecting apparatus may also be realized using a general-purpose computer device as basic hardware. That is, the elements of the apparatus can be realized by causing a processor mounted in the above described computer device to execute a program. In this case, the apparatus may be realized by installing the above described program in the computer device beforehand or may be realized by storing the program in a storage medium such as a CD-ROM or distributing the above described program over a network and installing this program in the computer device as appropriate. Furthermore, the storage in the apparatus may also be realized using a memory device or hard disk incorporated in or externally added to the above described computer device or a storage medium such as CD-R, CD-RW, DVD-RAM, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A data collecting apparatus comprising:
a computer configured to execute instructions to collect data; and
a memory storing instructions which when executed by the computer results in collecting the data by performing the following operations:
collecting, from a plurality of demanders, demand record data of energy and demand forecast data of the energy;
storing the collected demand record data and the demand forecast data;
calculating, for each demander, a reliability level of the demand forecast data on a basis of the demand record data, the reliability level representing the accuracy of the demand forecast data for the demand record data;
receiving an acquisition request of demand forecast of a future predetermined time range with respect to each demander, from an energy management system that makes an energy supply plan; and
generating a collection plan according to the acquisition request such that the demand forecast data of the future predetermined time range is collected less often from a demander with a higher reliability level, wherein
the demand forecast data of the future predetermined time range is collected, from each demander according to the collection plan, and
the demand forecast data of the future predetermined time range collected is provided to the energy management system before a start time of the future predetermined time range.

2. The apparatus according to claim 1, wherein
the acquisition request indicates that the demand forecast data of each future time range is received at a constant time interval,
generating a collection plan includes setting a larger number of cycles for collecting the demand forecast data, to the demander with the higher reliability level wherein a length of one cycle is identical to a length of the constant time interval, and generating the plan so as to collect demand forecast data of a corresponding future time range at an interval of the larger number of cycles, and
with respect to a future time range not collected due to the plan, demand forecast data collected most recently to the energy management system is provided.

3. The apparatus according to claim 2, further comprising a warning receiver configured to receive, from the demander, a warning that an error between the demand forecast data and the demand record data is equal to or more than a predetermined value, wherein
generating a collection plan includes modifying the collection plan so as to shorten a cycle numbers of collecting the demand forecast data from the demander from which the warning is received.

4. The apparatus according to claim 1, wherein the computer further performs the following operations:
collecting a restrainable amount of demand and a demand restraint record from the demander,
calculating, for each demander, a reliability level of the restrainable amount of demand on a basis of the demand restraint record,
generating a plan such that the restrainable amount of demand of the future predetermined time range are collected earlier from the demander with a higher reliability level,
collecting the restrainable amount of demand of the future predetermined time range, from the demander according to the plan, and
providing the collected restrainable amount of demand to the energy management system that controls supply-demand of the demander.

5. The apparatus according to claim 1, wherein the computer further performs the following operation:
calculating the demand forecast data on a basis of the demand record data collected, wherein
the demand forecast data is not collected but the demand record data with respect to at least one of the demanders is collected.

6. The apparatus according to claim 1, wherein the computer further performs the following operations:
receiving information indicating data collection time from the energy management system, and
transmitting, to the energy management system, the demand forecast data of the future predetermined time range, on or before the data collection time.

7. The apparatus according to claim 1, wherein the computer further performs the following operation:
using demand scheduled data instead of the demand forecast data, the demand scheduled data indicating a scheduled amount of use for a demand of each demander.

8. A data collecting method comprising:
collecting, from a plurality of demanders, demand record data of energy and demand forecast data of the energy;

storing the demand record data and the demand forecast data in a data history manager;

calculating, for each demander, a reliability level of the demand forecast data on a basis of the demand record data, the reliability level representing the accuracy of the demand forecast data for the demand record data;

receiving an acquisition request of demand forecast of a future predetermined time range with respect to each demander, from an energy management system that makes an energy supply plan; and making a collection plan according to the acquisition request such that the demand forecast data of the future predetermined time range is collected less often from a demander with a higher reliability level, wherein the demand forecast data of the future predetermined time range is collected from each demander according to the collection plan, and the demand forecast data of the future predetermined time range collected from each demander is provided to the energy management system before a start time of the future predetermined time range.

9. A data collecting apparatus comprising:

a computer configured to execute instructions to collect data; and a memory storing instructions which when executed by the computer results in collecting the data by performing the following operations:

a collecting, from a plurality of demanders, demand record data of energy and demand forecast data of the energy;

calculating, for each demander, a reliability level of the demand forecast data on a basis of the demand record data, the reliability level representing accuracy of the demand forecast data for the demand record data; and generating a collection plan such that the demand forecast data of a future predetermined time range is collected less often from a demander with a higher reliability level, wherein the demand forecast data of the future predetermined time range is collected, from each demander according to the collection plan.

10. A data collecting method comprising:

collecting, from a plurality of demanders, demand record data of energy and demand forecast data of the energy;

calculating, for each demander, a reliability level of the demand forecast data on a basis of the demand record data, the reliability level representing accuracy of the demand forecast data for the demand record data;

making a collection plan such that the demand forecast data of a future predetermined time range is collected less often from a demander with a higher reliability level, wherein collecting the demand forecast data of the future predetermined time range from each demander according to the collection plan.

* * * * *